Patented May 16, 1950

2,507,513

UNITED STATES PATENT OFFICE 2,507,513

PRODUCTION OF HEXAORGANO-DISILAPROPANES

John T. Goodwin, Jr., Pittsburgh, Pa., assignor to Dow Corning Corporation, Midland, Mich., a corporation of Michigan No Drawing. Application April 20, 1948, Serial No. 22,254. In Great Britain July 1, 1947

3 Claims. (Cl. 260—448.2)

The present invention relates to the production of compounds of the type $R_3SiCH_2SiR_3$ where R represents hydrocarbon radicals.

In the history of the organosilicon compounds, two principal types of compounds containing more than one silicon atom have heretofore been described. In one of these types, the silicon atoms are linked directly to each other. These are the so-called polysilanes heretofore described by Kipping. The present organosilicon industry is based upon the siloxanes which are materials in which the silicon atoms are linked through oxygen atoms. There has been some mention in the literature heretofore of organosilicon halides containing a plurality of silicon atoms in which the silicon atoms are linked by large divalent organic radicals and the remaining valences of the silicon atoms are satisfied by chlorine.

Objects of the present invention are to produce organosilicon compounds in which the silicon atoms are linked through methylene bridges.

In accordance with the process of this invention, compounds of this type are produced by reacting a compound of the type $R_3SiX$ with a compound of the type $R_3SiCH_2X$ by contacting the latter with the alkali metal in the presence of the former compound. The various R's in these reagents represent monovalent hydrocarbon radicals bonded to silicon by carbon to silicon bonding, such as alkyl radicals, for instance methyl and octadecyl, and monocyclic aryl radicals, for instance phenyl and tolyl. By this method compounds of the above indicated type are produced.

This is not in accordance with expectation since a Wurtz reaction might be expected to occur with the chloromethyl radicals. Also, in connection with the trimethyl silicon chloride, a reaction might be expected to yield hexamethyl disilane. However, it has been found that trimethyl silicon chloride does not react with sodium.

The triorganosilicon halides which are employed are those which contain 3 hydrocarbon radicals bonded to the silicon by carbon to silicon bonding and in which the halogen is either chlorine or bromine. Compounds of this variety have been described frequently in the literature.

The material reacted with the triorgano silicon halide has the general formula $R_3SiCH_2X$ where X is bromine or chlorine, and R is a monovalent hydrocarbon radical bonded to the silicon by carbon to silicon bonding. The compound of this type in which R represents methyl may be prepared if desired, by the chlorination of tetramethyl silane. It may likewise be prepared by reacting chloromethyl dimethyl silicon chloride with a methyl Grignard reagent. Other materials of this type may be prepared by reacting chloromethyl silicon trichloride with any desired Grignard reagent to introduce three organic radicals on each silicon.

The hydrocarbon radicals in each of these types of compounds are preferably aryl such as phenyl, or alkyl such as methyl or higher alkyl, for example, octadecyl.

The triorgano silicon halide and the triorgano chlormethyl silane may be contacted in liquid phase with the alkali metal by a variety of specific means. Thus a mixture of the two reactants may be mixed with the alkali metal. For this purpose it is convenient to suspend the alkali metal in a liquid vehicle non-reactive with respect to the alkali metal to which suspension the mixed reactants are added. Alternatively, the alkali metal may be added to a mixture of the 2 reagents. By another preferred procedure the alkali metal may be mixed with the triorgano silicon chloride and the mixture then mixed with the triorgano chlormethyl silane.

The reaction hereof occurs readily under atmospheric pressure at room temperature. Elevated temperature may be employed by increasing the pressure sufficiently to maintain at least a portion of the reactants in liquid phase. The reaction is sufficiently rapid that elevated temperature may also be employed by adding the two reactants to molten sodium in suspension.

Thus it is to be seen that whereas the reactants are either non-reactive with sodium or will react individually to produce undesired materials, the two materials will react with sodium to yield compounds which contain the fundamental structure $\equiv SiCH_2Si\equiv$. Compounds which contain this structure are of special utility as lubricants and as hydraulic fluids. In certain instances, they may likewise be employed for electrical uses as insulating materials. The particular and outstanding property of this class of compounds is their extreme chemical stability. Thus when the 6 hydrocarbon radicals which are linked to the silicon atoms are methyl groups, whereby instability of the organic radicals is avoided to the greatest extent, the compound is stable even in the presence of concentrated sulphuric acid, nitric acid and sodium hydroxide. This is a contrast to the equivalent compound in the siloxane series, hexamethyldisiloxane in which the siloxane linkage is hydrolyzed by any of these reagents.

The following examples illustrate the method of the present invention.

*Example 1.*—61 parts by weight of $$(CH_3)_3SiCH_2Cl$$

55 parts of $(CH_3)_3SiCl$ and 100 parts of hexadecane were placed in a reaction vessel and heated until refluxing occurred. 23 parts by weight of metallic sodium were added slowly in small pieces while stirring the reaction mixture. The reaction proceeded slowly at first due to the low reflux temperature. As the reaction occurred and the reactants were used up, the temperature rose and the reaction rate increased. The products were distilled from the reaction mixture until the boiling point indicated that hexadecane was starting to be distilled. The distillate was redistilled whereby 52 parts of a material boiling at 132.2° C. at 740 mm. were obtained. This material was found to be $(CH_3)_3SiCH_2Si(CH_3)_3$. The yield was 63.4 percent. The properties of this product are as follows:

|  | Observed | Calculated |
|---|---|---|
| Boiling Point | 132.2° C. at 740 mm |  |
| $(n)_d$ | 1.4154 at 25° C |  |
| Density | 0.7458 at 25° C |  |
| R [1] | 53.77 | 53.80 |
| Percent Si | 34.2 | 35 |
| Percent C | 50.6 | 52.0 |
| C/Si | 3.45 | 3.50 |
| Viscosity |  |  |

[1] Molar refraction based on paper by E. L. Warrick, JACS, 68, 2455 (1946).

*Example 2.*—69 parts by weight of metallic sodium and 400 parts toluene were placed in a flask and heated until the sodium melted. 183.8 parts of $(CH_3)_3SiCH_2Cl$ and 162.8 parts of $$(CH_3)_3SiCl$$

were mixed and added to the flask. The product was cooled and filtered, washed with toluene and distilled. There was obtained by this distillation 42.5 percent yield of $$(CH_3)_3SiCH_2Si(CH_3)_3$$

That which is claimed is:

1. The method of preparing compounds of the type $R_3SiCH_2SiR_3$ in which R is a member of the class consisting of alkyl and monocyclicaryl radicals which comprises reacting a compound of the type $R_3SiX$, in which X is selected from the group consisting of chlorine and bromine, with a compound of the type $R_3SiCH_2X$ by contacting the latter in liquid phase with an alkali metal in the presence of the former compound in liquid phase.

2. The method in accordance with claim 1 in which the alkali metal is contacted with a mixture of compounds of the types $R_3SiCH_2X$ and $R_3SiX$.

3. The method of accordance with claim 1 in which R represents methyl.

JOHN T. GOODWIN, Jr.

REFERENCES CITED

The following references are of record in the file of this patent:

Goodwin: "Jour. Am. Chem. Soc.," vol. 69 (Sept. 1947), page 2247.